(12) United States Patent
Clark et al.

(10) Patent No.: US 9,360,565 B2
(45) Date of Patent: Jun. 7, 2016

(54) RADIATION DETECTOR AND FABRICATION PROCESS

(75) Inventors: Andrew Clark, Palo Alto, CA (US); David L. Williams, Menlo Park, CA (US)

(73) Assignee: Translucent, Inc., Palo Alto, CA (US)

( * ) Notice: Subject to any disclaimer, the term of this patent is extended or adjusted under 35 U.S.C. 154(b) by 1558 days.

(21) Appl. No.: 12/779,355

(22) Filed: May 13, 2010

(65) Prior Publication Data

US 2011/0278464 A1 Nov. 17, 2011

(51) Int. Cl.
*G01T 1/26* (2006.01)
*G01T 1/202* (2006.01)
*G01T 1/20* (2006.01)

(52) U.S. Cl.
CPC ............... *G01T 1/202* (2013.01); *G01T 1/2018* (2013.01)

(58) Field of Classification Search
USPC ................................................ 250/361 R–371
See application file for complete search history.

(56) References Cited

U.S. PATENT DOCUMENTS

| | | | | |
|---|---|---|---|---|
| 4,525,628 | A * | 6/1985 | DiBianca et al. | 250/367 |
| 2003/0141484 | A1* | 7/2003 | Yamada et al. | 252/301.4 R |
| 2005/0127300 | A1* | 6/2005 | Bordynuik | 250/361 R |
| 2008/0299027 | A1* | 12/2008 | Kurata et al. | 423/263 |

* cited by examiner

*Primary Examiner* — Matthew Mikels
(74) *Attorney, Agent, or Firm* — Robert A. Parsons; Michael W. Goltry; Parsons & Goltry

(57) ABSTRACT

A monolithic integrated radiation detector includes a photodetector and a scintillator deposited directly on the photodetector. Preferably the photodetector is silicon and the scintillator is a rare earth phosphor. The rare earth phosphor is crystal lattice matched to the silicon by a transitional layer epitaxially grown therebetween.

7 Claims, 8 Drawing Sheets

RADIATION DETECTOR AND FABRICATION PROCESS

FIELD OF THE INVENTION

This invention relates to radiation detectors and fabrication methods and more particularly, to silicon radiation detectors.

BACKGROUND OF THE INVENTION

Radiation and various devices that produce radiation are prevalent in today's highly technical world. Generally, radiation can be classified as one or more of neutron, X-ray, gamma ray, alpha particle, or beta particle and the term "radiation" is defined herein as containing at least one of these types. It will be appreciated that in many instances it is desirable to determine the specific type of radiation and may also be desirable to determine the strength and direction of the radiation.

In the prior art various apparatus is used to detect the various types of radiation. For example, current neutron detectors include either gas detectors or scintillators. A typical gas detector includes $BF_3$ in a Geiger tube. A neutron incident on the Geiger tube causes a nuclear transmutation in the Boron that leads to the formation of a charged particle that is detected in the Geiger tube. Hence, the use of $BF_3$ in the Geiger tube makes the device sensitive to neutrons.

A 'scintillator' is defined herein as a material that emits light when radiation passes through it. A phosphor is an example of a scintillator since it exhibits phosphorescence after becoming excited into a relatively long lived state and light emission occurs. Gadolinium and other rare earths are the key constituents of several phosphors. Some phosphors commercially available for use as X-ray screens, neutron detectors, alpha particle scintillators, etc. are:

$Gd_2O_2S$:Tb(P43), green (peak at 545 nm) 1.5 ms decay to 10%, low afterglow, high X-ray absorption, for X-ray, neutrons and gamma;

$Gd_2O_2S$:Eu, red (627 nm) 850 µs decay, afterglow, high X-ray absorption, for X-ray, neutrons and gamma;

$Gd_2O_2S$:Pr, green (513 nm), 7 µs decay, no afterglow, high X-ray absorption, for X-ray, neutrons and gamma;

$Gd_2O_2S$:Pr,Ce,F, green (513 nm), 4 µs decay, no afterglow, high X-ray absorption, for X-ray, neutrons and gamma;

$Y_2O_2S$:Tb(P45), white (545 nm), 1.5 ms decay, low afterglow, high X-ray absorption, for low energy X-ray;

$Y_2O_2S$:Eu(P22R), red (627 nm), 850 µs decay, afterglow, for low energy X-ray; and $Y_2O_2S$:Pr, white (513 nm), 7 µs decay, afterglow, for low energy X-ray.

Many additional scintillator/phosphor materials are known and can be readily determined Radiation detectors utilizing scintillator materials typically include a large piece of plastic or glass doped with neutron sensitive phosphor and placed in proximity to a multiplier tube. Thus, in response to a neutron impinging on the phosphor, light is emitted which is sensed by the multiplier tube. This entire apparatus is relatively large and unwieldy.

Traditional energy dispersive X-ray or gamma ray detectors, such as HPGe (high purity Germanium) gamma ray detectors or SiLi (Lithium drifter Silicon) X-ray detectors, are also available and presently in use. However, these devices are relatively expensive and, as understood in the art, difficult to produce in large numbers.

It would be highly advantageous, therefore, to remedy the foregoing and other deficiencies inherent in the prior art.

An object of the present invention is to provide a new and improved radiation detector.

Another object of the present invention is to provide a radiation detector that is relatively small, easy to fabricate, and can be easily incorporated into other extensive testers, sensors, and/or detectors.

Another object of the present invention is to provide a new and improved method of fabricating radiation detectors.

Another object of the present invention is to provide a new and improved method of integrating radiation detectors into testing and sensing apparatus that is simpler and cheaper to fabricate and use.

SUMMARY OF THE INVENTION

Briefly, to achieve the desired objects and aspects of the instant invention in accordance with a preferred embodiment thereof provided is a monolithic integrated radiation detector including a photodetector and a scintillator deposited directly on the photodetector. Preferably the photodetector is silicon and the scintillator is a rare earth phosphor. The rare earth phosphor is crystal lattice matched to the silicon by a transitional layer epitaxially grown therebetween.

The desired objects and aspects of the instant invention are further achieved in accordance with a preferred method of fabricating a monolithic integrated radiation detector. The method includes epitaxially forming a photodetector with a radiation input surface and epitaxially depositing a scintillator directly on the radiation input surface of the photodetector.

BRIEF DESCRIPTION OF THE DRAWINGS

Specific objects and advantages of the instant invention will become readily apparent to those skilled in the art from the following detailed description of a preferred embodiment thereof taken in conjunction with the drawings, in which.

DETAILED DESCRIPTION OF THE DRAWINGS

Figure 1:
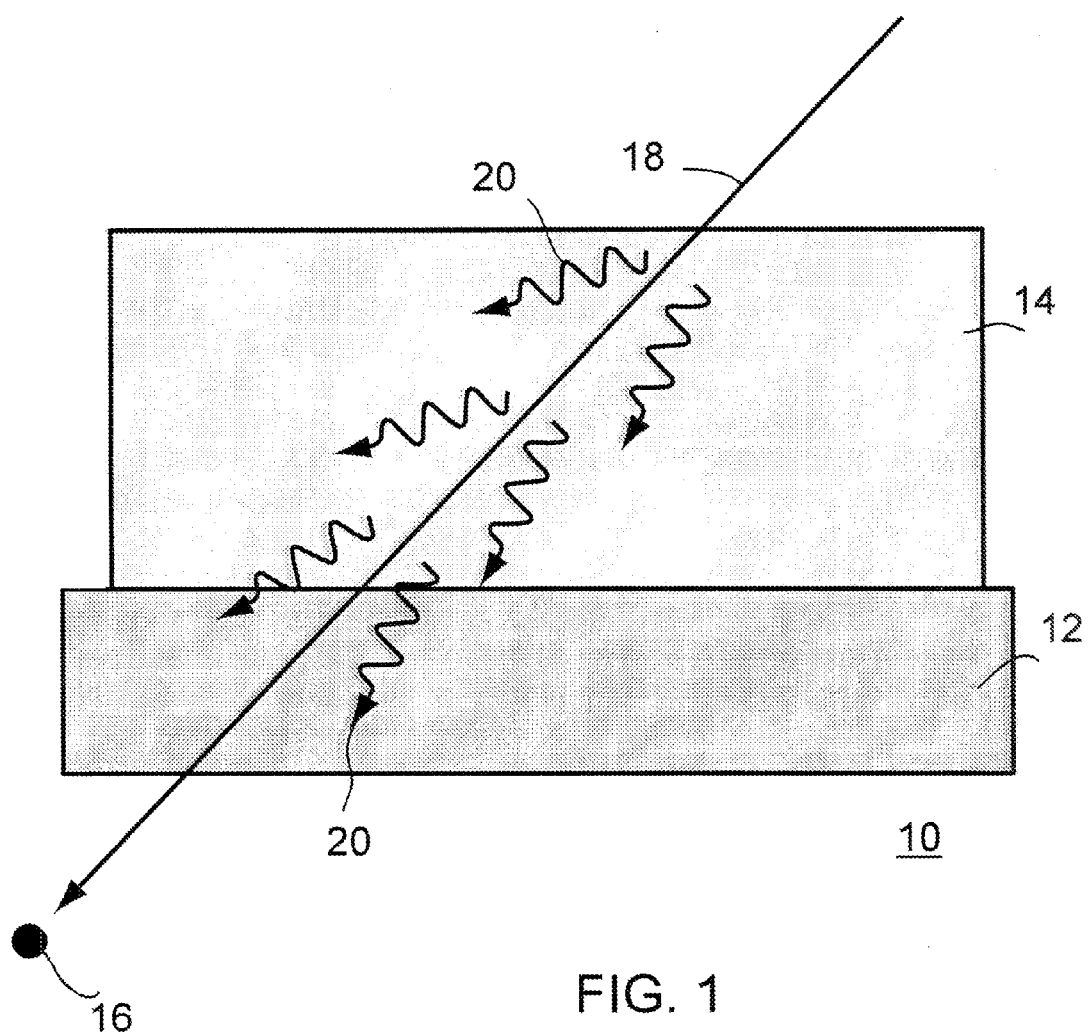
FIG. 1 is a simplified side view of a radiation detector in accordance with the present invention.

Turning now to the drawings, attention is first directed to FIG. 1, which illustrates a radiation detector 10 in accordance with the present invention. Radiation detector 10 is a monolithically integrated detector including a silicon photodetector 12 with a scintillator 14 deposited directly thereon. In this specific example, a neutron, designated 16, follows a path 18 through scintillator 14 and photodetector 12. As neutron 16 passes through scintillator 14 the material is excited and light, designated 20, is emitted. At least some of the light emitted by scintillator 14 is sensed by silicon photodetector 12. Thus, in this specific example radiation detector 10 senses the passage of neutron 16. It will be appreciated that other scintillators (e.g. X-ray, gamma ray alpha particle, or beta particle phosphorescent material) can be deposited directly on other photodetectors (e.g. solar cell, pin photodiode, avalanche photodiode, charge-coupled device, etc.) to produce radiation detectors of a desired type. It will also be appreciated that the most convenient, inexpensive and easiest material to use in the fabrication of the photodetectors is silicon. This is primarily because of the work and research performed in the silicon industry and the common use of silicon throughout the semiconductor industry.

A major problem with any attempts to deposit or incorporate phosphorescent materials, and especially, rare earth materials, with silicon is the particular crystal orientation of the material. Silicon has a cubic crystal orientation and many other phosphorescent materials, such as Gadolinium, have a cubic crystal orientation. The hexagonal and cubic crystal orientations are explained in more detail in a copending United States patent application entitled "High Efficiency Solar Cell Using IIIB Material Transition Layers", filed 19 Feb. 2010, assigned Ser. No. 12/708,969, and incorporated herein by reference. Through the use of selected transition layers deposited between silicon photodetector 12 and scintillator 14, the scintillator can be epitaxially grown directly on the photodetector and can, thus be produced very small and conveniently. For example, the photodetector and scintillator can be fabricated in a single operation without removing the wafer or substrate from the epitaxial chamber. Also, because of the convenient size and construction of the radiation detector, it can be easily incorporated into additional sensors, such as arrays of sensors, as explained in more detail below.

Figure 2:
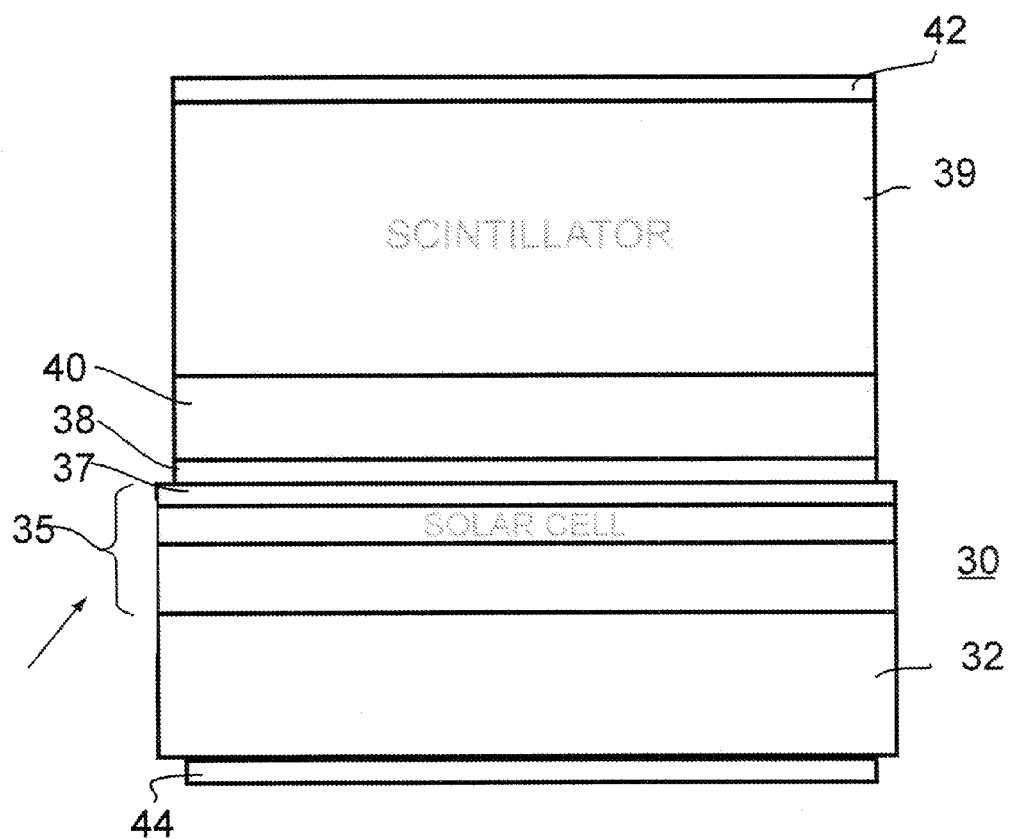
FIG. 2 is a simplified side view of a specific embodiment of a radiation detector in accordance with the present invention.

Turning additionally to FIG. 2, a specific embodiment of a radiation detector 30 in accordance with the present invention is illustrated. Radiation detector 30 includes a silicon substrate or wafer 32 which, as understood by the artisan is a single crystal semiconductor bulk material. It will also be understood that silicon is used in this example as the preferred material but other semiconductor materials known in the semiconductor field might be utilized. The detector portion of radiation detector 30 is a photodetector 34 which may be, for example, any one of a solar cell, pin photodiode, avalanche photodiode, charge-coupled device, etc. In this preferred embodiment a solar cell 35 is provided as a photodetector and is formed on substrate 32 in any well known process generally through epitaxial growth. An upper surface 37 of solar cell 35 is the radiation input surface for solar cell 35.

A thin layer 38 of undoped single crystal silicon (e.g. approximately 100 Å) is grown on radiation input surface 37 of solar cell 35 to aid in the lattice matching transition to a scintillator 39. In this specific example a lattice matching buffer layer 40 of Gadolinium Oxide is grown directly on and lattice matched to layer 38. It will be understood that layers 38 and 40 are considered as part or components of a crystal lattice matching transition layer. Buffer layer 40 is approximately 450 Å thick and formed to provide a gradual lattice match between the material of photodetector 34 and the material of scintillator 39. A more complete description of the lattice matching concept is explained in detail in the above described copending patent application.

In this specific example, scintillator 39 includes a layer of $GdErO_3$ approximately 1450 Å thick. While scintillator 39 may be any desired thickness, the thickness shown is selected to provide sufficient light for easy detection of radiation particles traversing therethrough. In addition to lattice matching the materials, buffer layer 40 is selected to not affect light (i.e. not absorb light) passing therethrough. A thin capping layer 42 of $GdO_3$ approximately 240 Å thick is grown on the surface of scintillator 39 for termination and protection. Also, a metallization layer 44 is grown on the reverse or back side of substrate 32 of aluminum or other selected contact metal. A second contact can be made to solar cell 35 through the upper layer thereof which is stepped radially to provide an external contact surface. Layers 42 and/or 44 may also be designed to prevent ambient light (optical wavelength photons) from entering radiation detector 30. Alternatively radiation detector 30 can be mounted inside a light tight box or other surrounding structure.

It will be understood by the artisan that silicon substrate or wafer 32 is a single crystal material and each of the various layers epitaxially grown are single crystal layers. Here it should be understood that the term "single crystal" is used to denote crystalline silicon grown or formed as a single continuous crystal well known in the art. Further, while lattice matching is well known it generally refers to the lattice spacing of a single crystal material being substantially the same as the lattice spacing of a single crystal material being deposited thereon.

Figure 3:
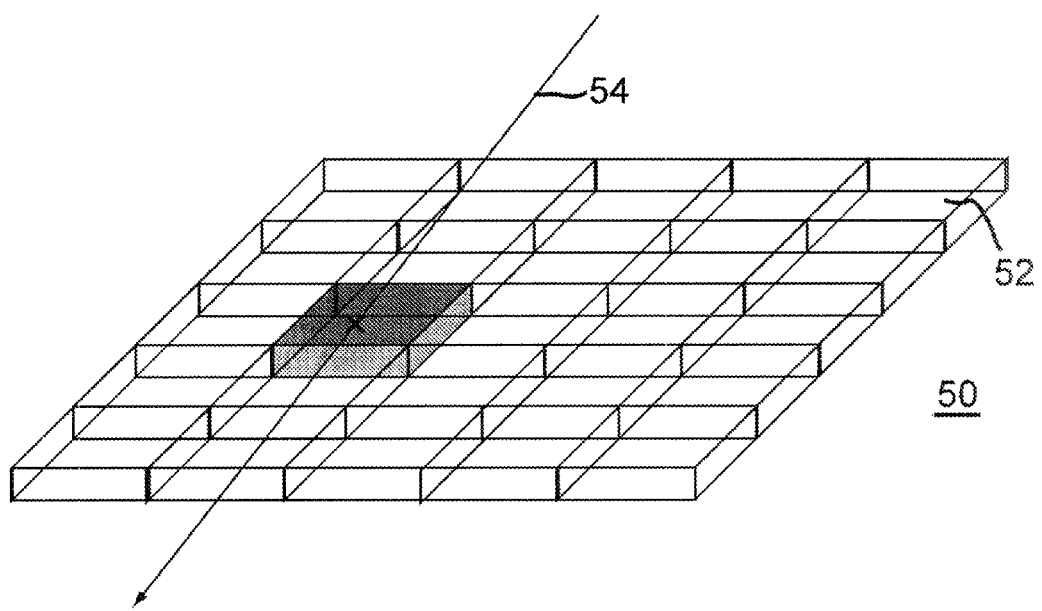
FIG. 3 is a simplified perspective view of a two dimensional array of radiation detectors in accordance with the present invention.

Referring specifically to FIG. 3, a two dimensional array 50 of radiation detectors 52, each of which can be for example similar to radiation detector 30 of FIG. 2, is illustrated. In this example, two dimensional array 50 includes several rows and columns (e.g. 5×5) of individual radiation detectors 52 each of which can be interconnected with adjacent radiation detectors by the upper contact (common contact) and individually addressed with the lower contact. Such an array can be used, for example, to determine the direction of a path 54 of radiation. Also, two dimensional array 50 makes an imaging system that can be used, for example, in medical diagnostic X-ray imaging (shadow radiographs).

Figure 4:
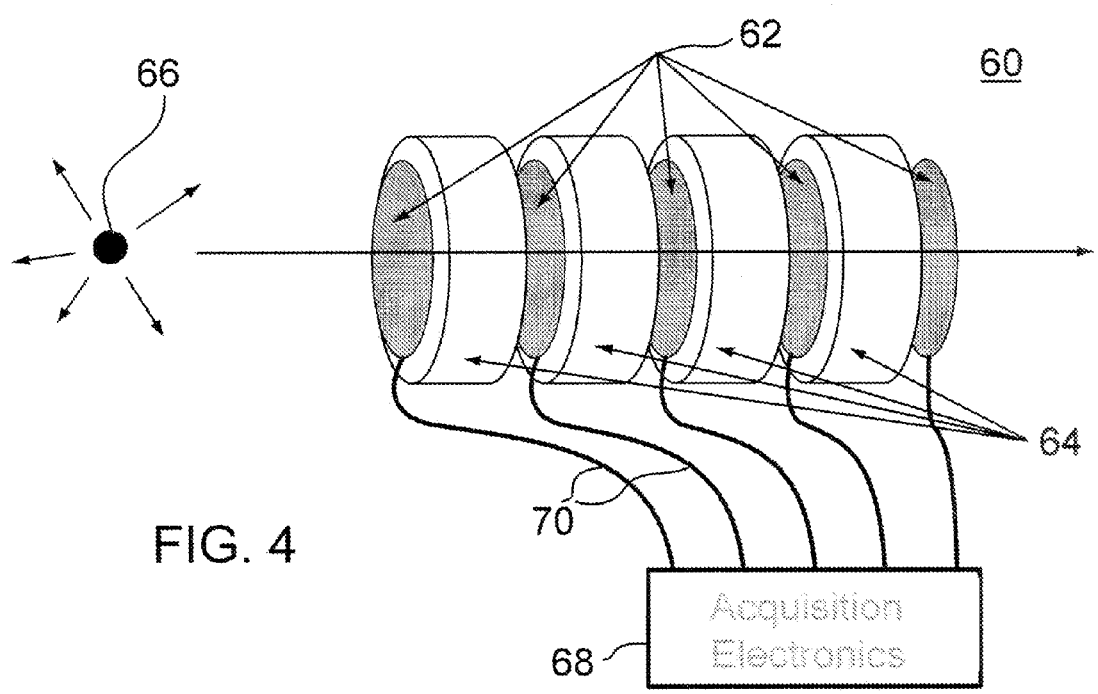
FIG. 4 is a simplified perspective view of an energy dispersive detector in accordance with the present invention.

Turning additionally to FIG. 4, an energy dispersive detector 60 is illustrated as a detector for analyzing the penetration depth of neutrons or X-rays, etc. Detector 60 includes a plurality of radiation detectors 62 (each of which could be similar to detector 30 of FIG. 2) having sandwiched therebetween moderators for neutron energy discrimination or high Z absorbers for X-ray/gamma ray energy discrimination, designated 64. Each of the radiation detectors 62 can be a single element detector if the location of the radioactive source, designated 66, is not required. To determine the location of radioactive source 66, the radiation detectors 62 can include one or more two dimensional arrays. Signals from each of the radiation detectors 62 are conveyed to acquisition electronics 68 by leads 70. The amplitude and timing of each signal supplied to acquisition electronics 68 can be used to determine the strength and/or penetration depth of the radiation being sensed.

Figure 5:
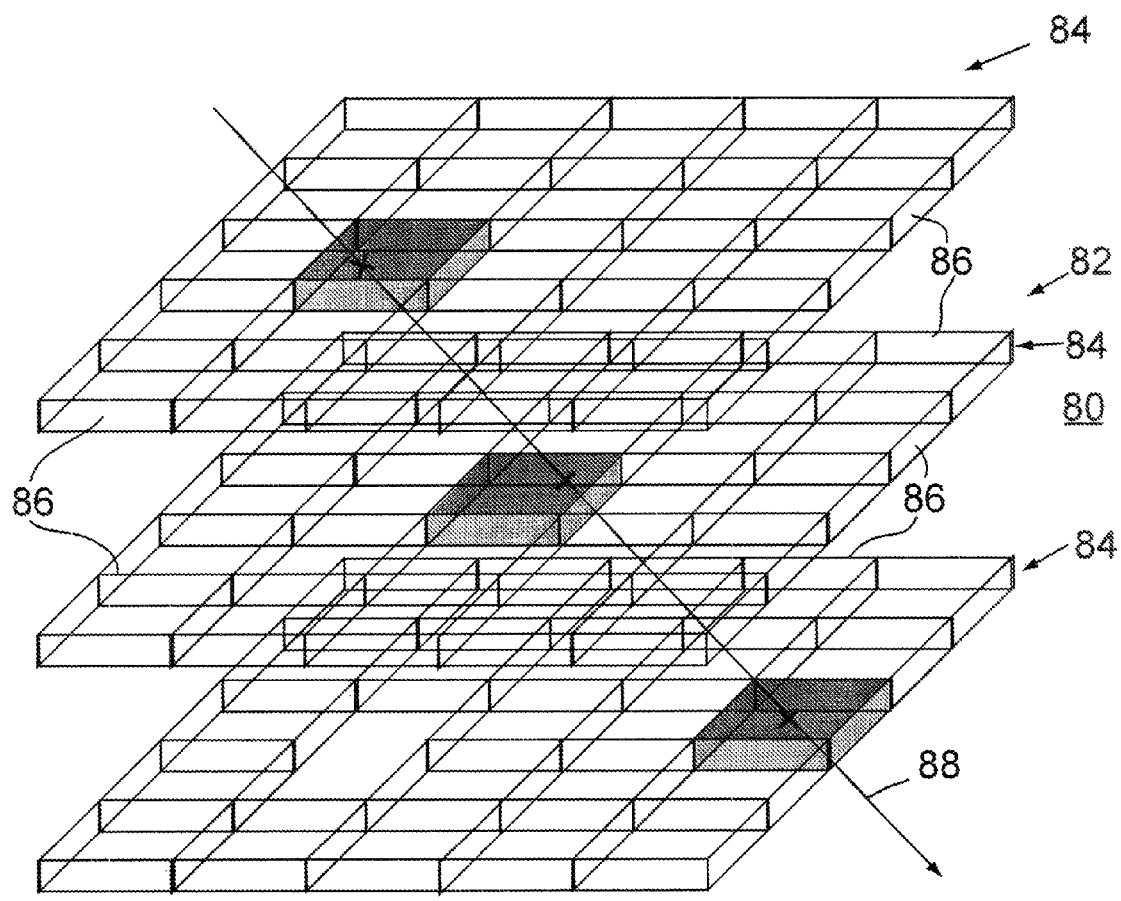
FIG. 5 is a simplified perspective view of a three dimensional array of radiation detectors in accordance with the present invention.

Referring specifically to FIG. 5, a three dimensional array 80 of radiation detectors 82, each of which can be for example similar to radiation detector 30 of FIG. 2, is illustrated. In this example, three dimensional array 80 includes a stack 82 of three or more two dimensional arrays 84 (e.g. array 50) stacked in parallel relationship. Each layer 84 of stack 82 includes several rows and columns (e.g. 5×5) of individual radiation detectors 86. Each individual radiation detector 86 can be interconnected with adjacent radiation detectors by the upper contact (common contact) and individually addressed with the lower contacts. The three dimensional array 80 can be used, for example, to determine the direction of a path 88 of radiation. As an example, the path, designated 88, of radiation can be determined by correlating the times at which various detectors 86 generate a signal.

Figure 6:
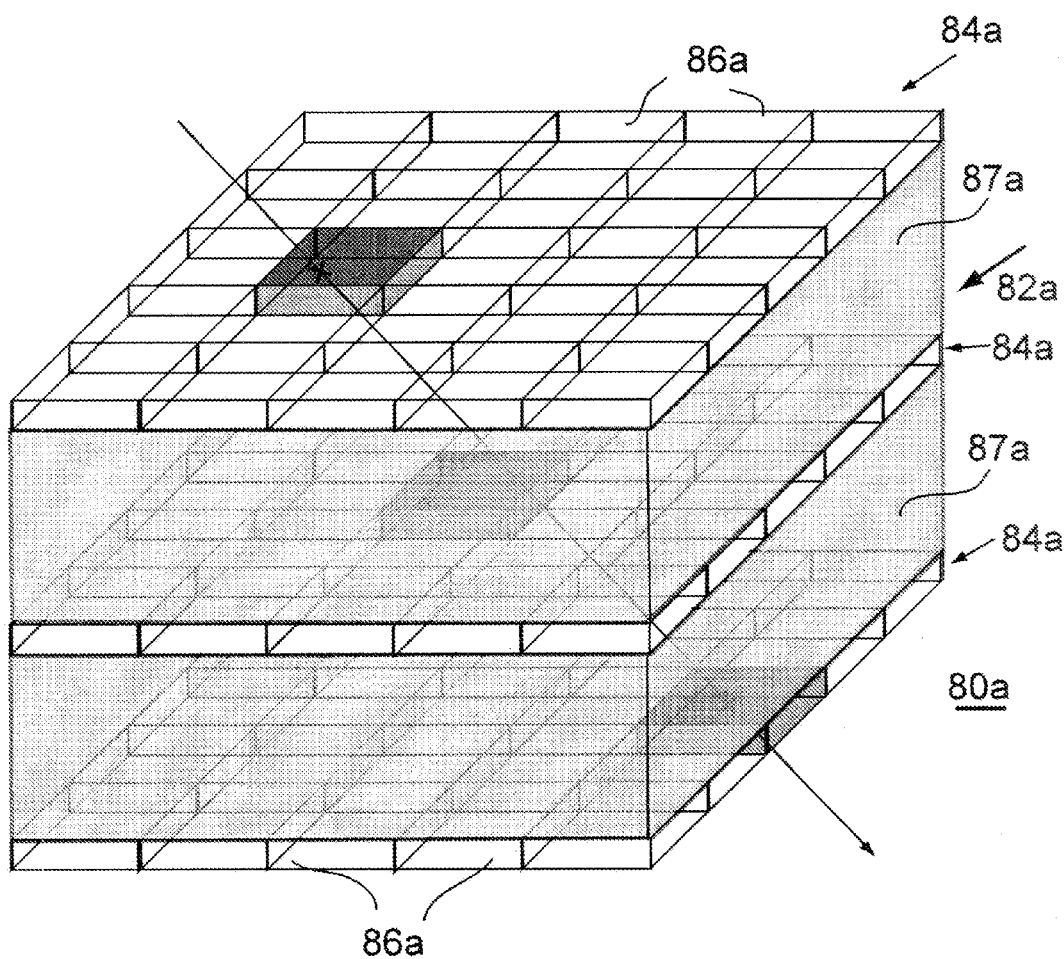
FIG. 6 is a simplified perspective view of another three dimensional array of radiation detectors in accordance with the present invention.

Referring additionally to FIG. 6, a stack 82a similar to stack 82 in FIG. 5 is modified by placing layers 87a of material that affects different types of radiation in different ways between adjacent layers 84a of radiation detectors 86a. Stack 82a can be used to determine the specific type of radiation being sensed. For example, introducing layers of X-ray absorbing material, such as lead, as layers 87a between layers 84a will attenuate X-ray signals, but neutron signals will be largely unaffected. Interspersing sheets of a moderator (such as high density polyethylene) and material to capture neutrons (such as borated polyethylene) as layers 87a will moderate and capture neutrons yet X-rays and gamma rays will pass through largely unaffected.

Also, stack 82a of FIG. 6 can be used to analyze the penetration depth of neutrons by including in the stack as layers 87a neutron absorbers. Also, stack 82a can be used for analyzing the penetration depth of X-rays by including in the stack as layers 87a X-ray absorbers (such as lead). In this fashion the penetration depth can be analyzed and the energy of the incident radiation can be estimated. This can be done by determining the number of layers in the stack from which a signal is generated, or the relative brightness of the signal in different layers of the stack. In an X-ray attenuating stack containing for example, lead or another high Z material, the energy of X-rays or gamma rays may be determined. Gamma rays will be attenuated to a significantly lesser degree than X-rays.

Figure 7:
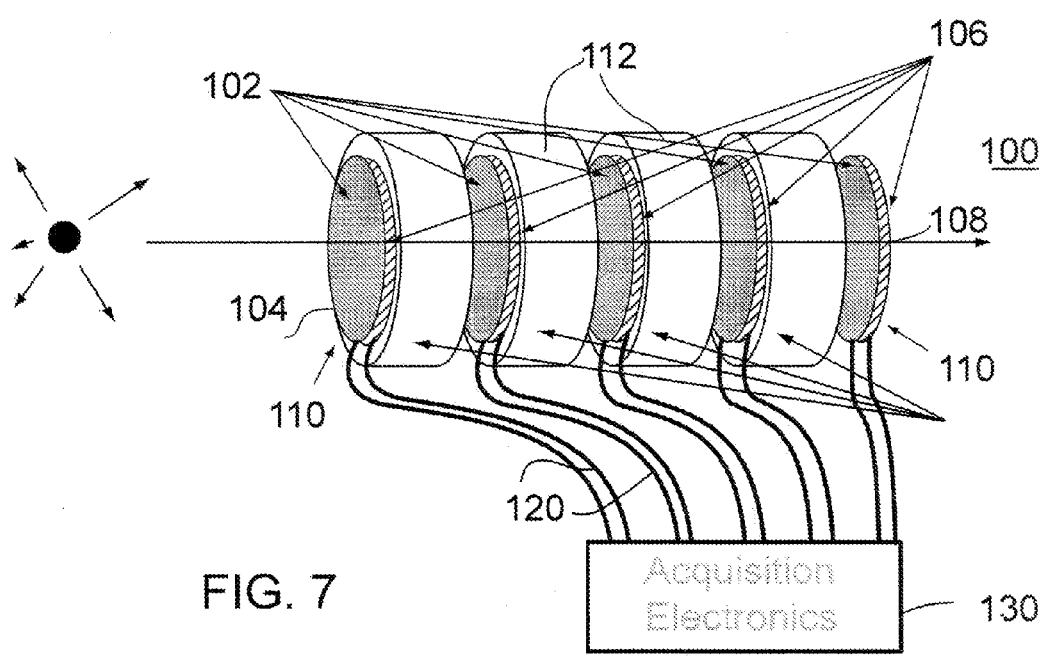
FIG. 7 is a simplified perspective view of an energy dispersive detector for discriminating between different radiations in accordance with the present invention.

Turning to FIG. 7, an energy dispersive detector stack 100 for discriminating between different radiations is illustrated. Detector stack 100 can also be used as a detector for analyzing the penetration depth of neutrons or X-rays, etc. Detector stack 100 includes a first plurality 102 of radiation detectors 104 spaced apart along a length. Each radiation detector 104 could be, for example, similar to detector 30 of FIG. 2. Detector stack 100 also includes a second plurality 106 of radiation detectors 108 each of which, for example could be similar to detector 30 of FIG. 2. Each radiation detector 104 is paired with or placed in parallel proximity to a radiation detector 108. In this embodiment each pair of detectors 104 and 108 form a compound radiation detector/discriminator element, designated 110. Further, adjacent compound radiation detector/discriminator elements 110 have a moderator/absorber element 112 sandwiched therebetween. Moderators are included for neutron energy discrimination and high Z absorbers are included for X-ray/gamma ray energy discrimination. Either or both moderators and absorbers can be included in elements 112, depending upon the specific application.

Figure 8:
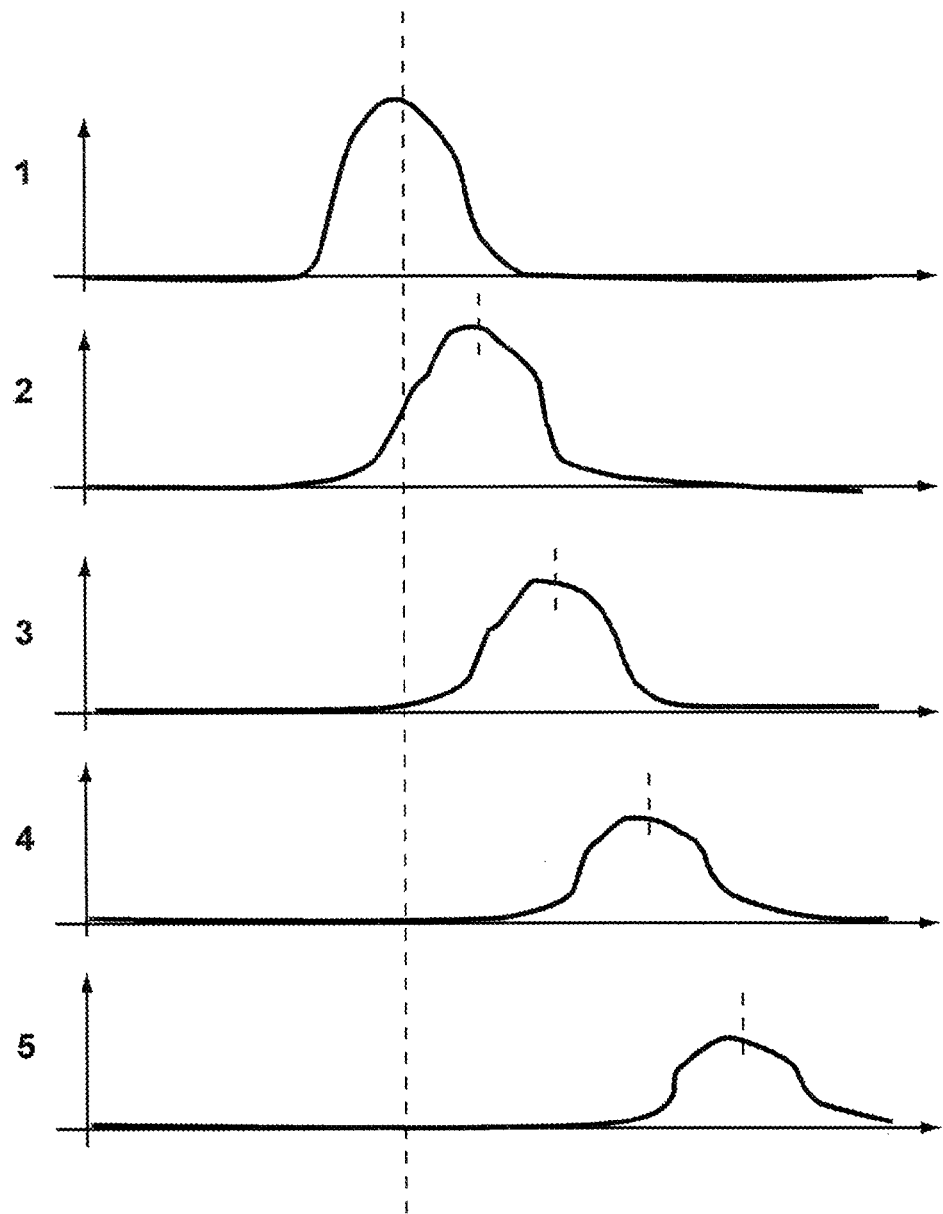
FIG. 8 is a simplified graphical view of amplitude and time delay measurements for a radiation particle moving between detectors of the array of, for example, FIG. 7.

Detector stack 100 forms what is sometimes referred to as a long stack and may contain any number of detector/discriminator elements 110 and interspersed moderator/absorber elements 112. In this embodiment each radiation detector 104 contains scintillator and photodetector compositions tailored to be more sensitive to neutrons. Similarly, each radiation detector 108 contains scintillator and photodetector compositions tailored to be more sensitive to X-rays and gamma rays. The use of different radiation detectors and either or both moderators and absorbers that are more sensitive to one radiation type than another allows the more effective discrimination of gamma rays/X-rays from neutrons Electrical signals from radiation detectors 104 and 108 are supplied by leads 120 to acquisition electronics 130. Referring to FIG. 8, a waveform for typical signals supplied by detector stack 100 is illustrated. The signal from each radiation detector 104 or 108 changes in amplitude and time delay as the specific particle or particles proceed through detector stack 100 from the left hand radiation detector to the right hand radiation detector. In detector stack 100 the specific type of radiation can be determined from the signals supplied to acquisition electronics 130 by radiation detectors 104 and 108. Also, the amplitude and timing of each signal supplied to acquisition electronics 130 can be used to determine the strength and/or penetration depth of the radiation being sensed.

Thus, a new and improved radiation detector has been disclosed that can be easily fabricated into small individual sensors or into arrays of sensors. The new and improved radiation detector is relatively small, easy to fabricate, and can be easily incorporated into other extensive testers, sensors, and/or detectors. Also, a new and improved method of fabricating radiation detectors is disclosed in which an entire monolithic integrated radiation detector is fabricated in a single operation. For example the new monolithic integrated radiation detector can be epitaxially formed in a chamber in situ (i.e. not removed from the chamber between the epitaxial growth of different layers). Therefore, a new and improved method is disclosed of integrating monolithic radiation detectors into testing and sensing apparatus that is simpler and cheaper to fabricate and use.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A monolithic integrated radiation detector comprising:
   a substrate of single crystal semiconductor material;
   a photodetector of a single crystal material formed on and crystal lattice matched to the substrate; and
   a scintillator of single crystal material formed on and crystal lattice matched to the photodetector.

2. A monolithic integrated radiation detector as claimed in claim 1 wherein the photodetector includes one of a solar cell, a pin photodiode, an avalanche photodiode, or a charge coupled device.

3. A monolithic integrated radiation detector as claimed in claim 1 wherein the photodetector is a silicon photodetector.

4. A monolithic integrated radiation detector as claimed in claim 1 wherein the scintillator includes a single crystal rare earth phosphor.

5. A monolithic integrated radiation detector as claimed in claim 1 wherein the photodetector and scintillator of the radiation detector are tailored to be more sensitive to one of neutrons or X-rays/gamma rays.

6. A monolithic integrated radiation detector comprising:
   a substrate of single crystal semiconductor material;
   a silicon photodetector of single crystal material formed on and crystal lattice matched to the substrate, the silicon photodetector including one of a solar cell, a pin photodiode, an avalanche photodiode, or a charge coupled device, the silicon photodetector including a radiation input surface; and
   a transition layer including single crystal silicon and single crystal rare earth oxide formed on and crystal lattice matched to the radiation input surface of the silicon photodetector;
   a scintillator including a single crystal rare earth phosphor; and the scintillator formed on and crystal lattice matched to the radiation input surface of the photodetector.

7. A monolithic integrated radiation detector as claimed in claim 6 wherein the photodetector and scintillator of the radiation detector are tailored to be more sensitive to one of neutrons or X-rays/gamma rays.

\* \* \* \* \*